(12) United States Patent
Edwards et al.

(10) Patent No.: US 12,321,754 B2
(45) Date of Patent: Jun. 3, 2025

(54) HYBRID LINUX BOOTUP USING NETWORK BOOT, RAM BOOT, AND DISK BOOT

(71) Applicant: Infinera Corp., San Jose, CA (US)

(72) Inventors: Bryce Edwards, Sunnyvale, CA (US); Ramanujan Puranam, San Jose, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/840,820

(22) Filed: Jun. 15, 2022

(65) Prior Publication Data

US 2022/0398104 A1 Dec. 15, 2022

Related U.S. Application Data

(60) Provisional application No. 63/210,531, filed on Jun. 15, 2021.

(51) Int. Cl.
| | | |
|---|---|---|
| *G06F 9/00* | (2018.01) | |
| *G06F 9/4401* | (2018.01) | |
| *G06F 9/54* | (2006.01) | |
| *G06F 15/177* | (2006.01) | |

(52) U.S. Cl.
CPC ............ *G06F 9/4403* (2013.01); *G06F 9/545* (2013.01)

(58) Field of Classification Search
CPC ............................... G06F 9/4403; G06F 9/545
See application file for complete search history.

(56) References Cited

U.S. PATENT DOCUMENTS

| | | | |
|---|---|---|---|
| 7,412,450 B1* | 8/2008 | Bonwick | H04L 9/3236 |
| 8,874,888 B1* | 10/2014 | Beda, III | G06F 9/45558 |
| | | | 718/1 |
| 9,563,418 B1* | 2/2017 | Walton | G06F 8/654 |
| 2003/0084337 A1* | 5/2003 | Simionescu | H04L 41/0803 |
| | | | 713/190 |
| 2006/0107030 A1* | 5/2006 | Biondi | G06F 9/4416 |
| | | | 713/2 |
| 2009/0164840 A1* | 6/2009 | Nagai | G06F 11/1435 |
| | | | 714/E11.127 |
| 2013/0219161 A1* | 8/2013 | Fontignie | G06F 9/4401 |
| | | | 713/2 |
| 2015/0331692 A1* | 11/2015 | Schekochikhin | G06F 9/5077 |
| | | | 713/2 |

* cited by examiner

*Primary Examiner* — Mohammed H Rehman

(57) ABSTRACT

Disclosed herein are network elements for use in a transport network and methods of using the same. The network elements may comprise an embedded device having a processor, a communication device in communication with the processor, a first memory, a second memory, and a third memory. The third memory may store a hybrid boot sequence comprising computer-executable instructions that when executed by the processor of the embedded device cause the embedded device to: determine whether a first kernel image is stored on the first memory; responsive to the determination that the first kernel image is not stored on the first memory, obtain a second kernel image stored on a remote network element; store at least one of the first kernel image and the second kernel image on the second memory as a primary kernel image; and boot the primary kernel image stored on the second memory.

18 Claims, 4 Drawing Sheets

HYBRID LINUX BOOTUP USING NETWORK BOOT, RAM BOOT, AND DISK BOOT

CROSS-REFERENCE TO RELATED APPLICATION

This application claims priority to U.S. Provisional Patent Application No. 63/210,531, filed Jun. 15, 2021, entitled "Hybrid Linux Bootup Using Network Boot, RAM Boot and Disk Boot", the entire contents of which are incorporated herein by reference.

BACKGROUND

Embedded systems may employ a number of different booting methods, each with its own costs and benefits in terms of performance and reliability. In a network boot, the kernel, root filesystem, and software applications are downloaded to the embedded system from a remote server. The use of network boot is resilient against local disk failures, but requires that the remote server be online and accessible by the embedded system. In a random-access memory ("RAM") boot, the kernel, root filesystem, and software applications are loaded from a disk onto a boot volume or a filesystem mounted to RAM. The use of RAM boot is fast, but requires reserving a portion of system RAM for the boot filesystem at the expense of applications. In a disk boot, the kernel, root filesystem, and applications are loaded directly from a boot volume or a filesystem stored on a local disk. Disk boot is slower than RAM boot, but does not require that any RAM be reserved for a boot filesystem, leaving all of the RAM available for applications.

Legacy embedded computer hardware eschewed local disks based on cost, power, and size constraints, instead relying entirely on network boot using a reliable connected server. Recent advancement in flash devices that provide high capacity at a low cost has made including such devices in modern embedded devices a standard practice. However, despite the presence of high-capacity disks, unattended embedded devices cannot rely solely on disk boot; in the event the disk fails, the embedded device will not boot whatsoever. Repairing the embedded device in such a scenario requires that it be physically removed, which may be particularly burdensome where the embedded device is difficult for a technician to access.

Therefore, a need exists for systems and methods for booting embedded systems that utilize aspects of network boot, RAM boot, and disk boot to extract the enhanced capability from constrained embedded targets, thus taking advantage of the performance improvements available through local boot options, while guaranteeing that the embedded device is always capable of booting.

SUMMARY

The problems of the conventional methodologies for booting embedded systems are addressed by transport networks utilizing a hybrid boot sequence in which a first network element is configured to utilize a RAM boot for the kernel and the root filesystem, a disk boot for the system services and the software applications, and a network boot in the event of a local disk failure. The first network element begins by acquiring a default kernel image from a local disk. If no default kernel image is stored on the local disk, or if the default kernel image stored on the local disk cannot be verified, the first network element acquires a backup kernel image from a second network element that is remote from the first network element. In either case, the first network element loads the acquired kernel image and the root filesystem into RAM and boots the acquired kernel image from RAM. This hybrid boot sequence unifies local and remote boot methods for enhanced resiliency against independent failures of their respective boot media (i.e., a local disk and a network element).

In one aspect, in accordance with some implementations, the disclosure describes a network element in a transport network, the network element comprising: an embedded device having a processor; a communication device in communication with the processor of the embedded device and operable to communicate via a communication network; a first memory, the first memory being a non-transitory computer-readable medium; a second memory, the second memory being a non-transitory computer-readable medium; and a third memory, the third memory being a non-transitory computer readable medium storing a hybrid boot sequence comprising computer-executable instructions that when executed by the processor of the embedded device cause the embedded device to: determine whether a first kernel image is stored on the first memory; responsive to the determination that the first kernel image is not stored on the first memory, request a second kernel image via the communication network, the second kernel image stored on a remote network element in the transport network; store at least one of the first kernel image and the second kernel image on the second memory as a primary kernel image; and boot the primary kernel image stored on the second memory.

In another aspect, in accordance with some implementations, the disclosure describes a network element in a transport network, the network element comprising: an embedded device comprising a processor; a communication device in communication with the embedded device and operable to communicate via a communication network; a first memory, the first memory being a non-transitory computer-readable medium and configured to store a first kernel image provided with validity information indicative of at least one of an integrity and an authenticity of the first kernel image; a second memory, the second memory being a non-transitory computer-readable medium; and a third memory, the third memory being a non-transitory computer readable medium storing a hybrid boot sequence computer-executable instructions that when executed by the processor of the embedded device cause the embedded device to: verify the first kernel image based at least in part on the validity information; responsive to a failure of the verification of the first kernel image, request a second kernel image via the communication network, the second kernel image stored on a remote network element; store at least one of the first kernel image and the second kernel image on the second memory as a primary kernel image; and boot the primary kernel image.

In another aspect, in accordance with some implementations, the disclosure describes a method, comprising: determining, with an embedded device, whether a first kernel image is stored on a first memory, the embedded device comprising one or more of a computer processor, an application specific integrated circuit, a field programmable gate array, a programmable circuit board, and a microcontroller, and the first memory being a non-transitory computer-readable medium; responsive to the determination that the first kernel image is not stored on the first memory, requesting, with the embedded device utilizing a communication device, a second kernel image via a communication network, the communication device being in communication with the embedded device and operable to communicate via the communication network, and the second kernel image stored on a remote network element; storing, with the embedded device, at least one of the first kernel image and the second kernel image on a second memory as a primary kernel image, the second memory being a non-transitory computer-readable medium; and booting, with the embedded device, the primary kernel image.

In another aspect, in accordance with some implementations, the disclosure describes a method, comprising: verifying, with an embedded device, a first kernel image stored on a first memory, the embedded device comprising one or more of a computer processor, an application specific integrated circuit, a field programmable gate array, a programmable circuit board, and a microcontroller, the first kernel image provided with validity information indicative of at least one of an integrity and an authenticity of the first kernel image, the verification of the first kernel image being based at least in part on the validity information, and the first memory being a non-transitory computer-readable medium; responsive to a failure of the verification of the first kernel image, requesting, with the embedded device utilizing a communication device, a second kernel image via a communication network, the communication device being in communication with the embedded device and operable to communicate via the communication network, and the second kernel image stored on a remote network element; storing, with the embedded device, at least one of the first kernel image and the second kernel image on a second memory as a primary kernel image, the second memory being a non-transitory computer-readable medium; and booting, with the embedded device, the primary kernel image.

Implementations of the above techniques include methods, apparatus, systems, and computer program products. One such computer program product is suitably embodied in a non-transitory machine-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
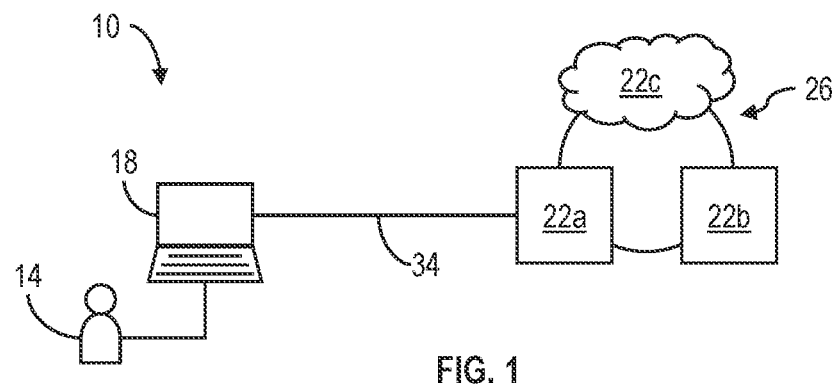
FIG. 1 is a diagram of an exemplary embodiment of a hybrid boot system constructed in accordance with the present disclosure.

The following detailed description of example embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one example," "for example," or "an example" means that a particular element, feature, structure, or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value. It is not intended that the scope of the invention be limited to the specific values recited when defining a range. All ranges are inclusive and combinable.

When values are expressed as approximations, e.g., by use of the antecedent "about," it will be understood that the particular value forms another embodiment. Reference to a particular numerical value includes at least that particular value unless the context clearly dictates otherwise. The term "about" when used in reference to numerical ranges, cutoffs, or specific values is used to indicate that the recited values may vary by up to as much as 10% from the listed value. Thus, the term "about" is used to encompass variations of ±10% or less, variations of ±5% or less, variations of ±1% or less, variations of ±0.5% or less, or variations of ±0.1% or less from the specified value.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

Software may include one or more computer readable instruction that when executed by one or more component, e.g., a processor, causes the component to perform a specified function. It should be understood that the algorithms described herein may be stored on one or more non-transitory computer readable medium. Exemplary non-transitory computer readable mediums may include random access memory (RAM), a read only memory (ROM), and/or a non-volatile memory such as, for example, a CD-ROM, a hard drive, a solid-state drive, a flash drive, a memory card, a DVD-ROM, a Blu-ray Disk, a disk, an optical drive, combinations thereof, and/or the like.

Such non-transitory computer readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, the term "kernel image" corresponds to a central component of an operating system configured to interface between hardware components and software processor of a computer, an embedded system, and/or the like.

As used herein, a "route" and/or an "optical route" may correspond to an optical path and/or an optical light path. For example, an optical route may specify a path along which light is carried between two or more network entities.

Users of optical networks may want to determine information associated with the optical network. Optical network information may be difficult to obtain, aggregate, and display. Implementations described herein assist a user in obtaining and viewing aggregated optical network information, such as network information associated with network entities and optical links between the network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may be an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may be a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 382 spectral slices, where each spectral slice may represent 12.5 GHz of the 4.8 THz spectrum. A super-channel may include a different quantity of spectral slices depending on the super-channel type.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

Referring now to the drawings, and in particular to FIG. 1, shown therein is a diagram of an exemplary embodiment of a hybrid boot system 10 constructed in accordance with the present disclosure. A user 14 may interact with the hybrid boot system 10 using a user device 18 that may be used to communicate with one or more network element 22 (hereinafter "network elements 22") of a transport network 26 (e.g., a first node 22a, a second node 22b, and/or a cloud-based server 22c), via a communication network 34.

In accordance with the present disclosure, a network element 22 may be a holder, like a chassis, or a contained/logical equipment, like an optical line card within the chassis. In one embodiment, the network element 22 may be a logical entity comprising one or more chassis having one or more pluggable that form the network element 22. For instance, pluggable cards may include traffic carrying ("data plane") cards that may have customized silicon such as ASICs or FPGAs that process the data plane frames/packets, based on the functionality of the card. Another exemplary traffic carrying card is a router line-card which has packet processing ASICs or other specialized silicon. Another exemplary embedded device is an optical line card that includes a DSP module and/or optical photonic circuits. Pluggable cards may also refer to control cards ("control and management plane") that do not process data packets but run all the software that implement the control plane (routing protocols) and management plane (management interfaces such as CLI, NETCONF, gRPC, DHCP etc.) such as a controller card. The controller card typically has an off-the-shelf CPU (such as Intel or ARM) and run some variant of an operating system (more recently, Linux or QNX or BSD), described below in more detail. Other embedded devices include common cards that may also be added such as fan trays, power entry modules, and others that provide auxiliary functions of the chassis.

In some embodiments, the cloud-based server 22c may comprise a processor and a memory having a data lake that may store copies of data such as sensor data, system data, metrics, logs, tracing, etc. in a raw format as well as transformed data that may be used for tasks such as reporting, visualization, analytics etc. The data lake may include structured data from relational databases, semi-structured data, unstructured data, time-series data, and binary data. The data lake may be a data base, a remote accessible storage, or a distributed filesystem.

The communication network 34 may be almost any type of network. For example, in some embodiments, the communication network 34 may be a version of an Internet network (e.g., exist in a TCP/IP-based network). In one embodiment, the communication network 34 is the Internet. It should be noted, however, that the communication network 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

If the communication network 34 is the Internet, a primary user interface of the hybrid boot system 10 may be delivered through a series of web pages or private internal web pages of a company or corporation, which may be written in hypertext markup language, and accessible by the user device 18. It should be noted that the primary user interface of the hybrid boot system 10 may be another type of interface including, but not limited to, a Windows-based application, a tablet-based application, a mobile web interface, an application running on a mobile device, and/or the like.

The transport network 26 may be, for example, a packet transport network (such as IP, MPLS, or MPLS-TP packet transport networks) and/or an optical transport network (such as OTN or WDM transport networks). The transport network 26 may be considered as a graph made up of interconnected individual nodes (that is, the network elements 22). If the transport network 26 is an optical transport network, the transport network 26 may include any type of network that uses light as a transmission medium. For example, the transport network 26 may include a fiber-optic based network, an optical transport network, a light-emitting diode network, a laser diode network, an infrared network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the hybrid boot system 10 may perform one or more functions described as being performed by another one or more of the devices of the hybrid boot system 10. Devices of the hybrid boot system 10 may interconnect via wired connections, wireless connections, or a combination thereof.

Figure 2:
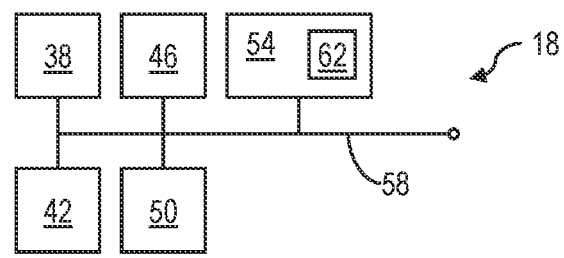
FIG. 2 is a diagram of an exemplary embodiment of a user device of the hybrid boot system shown in FIG. 1.

Referring now to FIG. 2, shown therein is a diagram of an exemplary embodiment of the user device 18 of the hybrid boot system 10 constructed in accordance with the present disclosure. In some embodiments, the user device 18 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the user device 18 may include one or more user input device 38 (hereinafter "user input device 38"), one or more user output device 42 (hereinafter "user output device 42"), one or more user processor 46 (hereinafter "user processor 46"), one or more user communication device 50 (hereinafter "user communication device 50") capable of interfacing with the communication network 34, one or more non-transitory computer readable medium 54

(hereinafter "user memory 54") storing processor-executable code and/or software application(s), for example including, a web browser capable of accessing a website and/or communicating information and/or data over a wireless or wired network (e.g., the communication network 34), and/or the like. The user input device 38, the user output device 42, the user processor 46, the user communication device 50, and the user memory 54 may be connected via a path 58 such as a data bus that permits communication among the components of the user device 18.

The user memory 54 may store a user application 62 that, when executed by the user processor 46, causes the user device 18 to perform an action such as communicate with or control one or more component of the user device 18, the transport network 26 (e.g., the network elements 22) and/or the communication network 34.

The user input device 38 may be capable of receiving information input from the user 14 and/or the user processor 46, and transmitting such information to other components of the user device 18 and/or the communication network 34. The user input device 38 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The user output device 42 may be capable of outputting information in a form perceivable by the user 14 and/or the user processor 46. For example, implementations of the user output device 42 may include, but are not limited to, a computer monitor, a screen, a touchscreen, a speaker, a website, a television set, a smart phone, a PDA, a cell phone, a fax machine, a printer, a laptop computer, a haptic feedback generator, combinations thereof, and the like, for example. It is to be understood that in some exemplary embodiments, the user input device 38 and the user output device 42 may be implemented as a single device, such as, for example, a touchscreen of a computer, a tablet, or a smartphone. It is to be further understood that as used herein the term "user 14" is not limited to a human being, and may comprise a computer, a server, a website, a processor, a network interface, a user terminal, a virtual computer, combinations thereof, and/or the like, for example.

The communication network 34 may permit bi-directional communication of information and/or data between the user device 18 and/or the network elements 22 of the transport network 26. The communication network 34 may interface with the user device 18 and/or the network elements 22 in a variety of ways. For example, in some embodiments, the communication network 34 may interface by optical and/or electronic interfaces, and/or may use a plurality of network topographies and/or protocols including, but not limited to, Ethernet, TCP/IP, circuit switched path, combinations thereof, and/or the like. The communication network 34 may utilize a variety of network protocols to permit bi-directional interface and/or communication of data and/or information between the user device 18 and/or the network elements 22.

Figure 3:
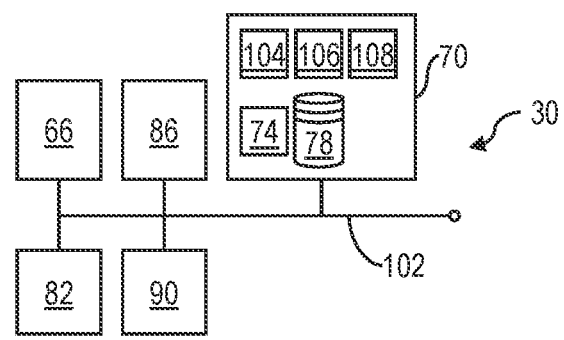
FIG. 3 is a diagram of an exemplary embodiment of a cloud-based server of the hybrid boot system shown in FIG. 1.

Referring now to FIG. 3, shown therein is a diagram of an exemplary embodiment of a cloud-based server 22c constructed in accordance with the present disclosure. The cloud-based server 22c may include one or more devices that execute one or more microservice. In the illustrated embodiment, the cloud-based server 22c is provided with one or more server processor 66 (hereinafter "server processor 66"), one or more server memory 70 (hereinafter "server memory 70") storing cloud server software 74 and one or more server database 78 (hereinafter "server database 78"). The server memory 70 may be a non-transitory computer readable storage medium accessible by the server processor 66 of the cloud-based server 22c. In some embodiments, the server database 78 may be a time series database. The server database 78 may be a relational database or a non-relational database. Examples of such databases comprise, DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The server database 78 can be centralized or distributed across multiple systems.

In some embodiments, the server processor 66 may comprise one or more server processor 66 working together, or independently, to read and/or execute processor executable code, such as the cloud server software 74. The server processor 66 may be capable of creating, manipulating, retrieving, altering, and/or storing data structures into the server memory 70. Additionally, each cloud-based server 22c may include at least one server input device 82 (hereinafter "server input device 82") and at least one server output device 86 (hereinafter "server output device 86"). Each element of the cloud-based server 22c may be partially or completely network-based or cloud-based, and may or may not be located in a single physical location.

Exemplary embodiments of the server processor 66 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The server processor 66 may be capable of communicating with the server memory 70 via a path 102 (e.g., data bus). The server processor 66 may be capable of communicating with the server input device 82 and/or the server output device 86.

The server processor 66 may be further capable of interfacing and/or communicating with the user device 18 and/or the network elements 22 via the communication network 34 using a server communication device 90. For example, the server processor 66 may be capable of communicating via the communication network 34 by exchanging signals (e.g., analog, digital, optical, and/or the like) via one or more ports (e.g., physical or virtual ports) using a network protocol to provide updated information to the user device 18.

The server memory 70 may be implemented as a conventional non-transitory computer readable medium, such as for example, random access memory ("RAM"), CD-ROM, a hard drive, a solid-state drive, a flash drive, a memory card, a DVD-ROM, a disk, an optical drive, combinations thereof, and/or the like, for example.

In some embodiments, the server memory 70 may be located in the same physical location as the cloud-based server 22c, and/or one or more server memory 70 may be located remotely from the cloud-based server 22c. For example, the server memory 70 may be located remotely from the cloud-based server 22c and communicate with the server processor 66 via the communication network 34. Additionally, when more than one server memory 70 is used, a first server memory 70 may be located in the same physical location as the server processor 66, and additional server memory 70 may be located in a location physically remote from the server processor 66. Additionally, the server memory 70 may be implemented as a "cloud" non-transitory computer readable storage memory (i.e., one or more server memory 70 may be partially or completely based on or accessed using the communication network 34).

The server input device 82 may transmit data to the server processor 66 and may be similar to the user input device 38. The server input device 82 may be located in the same physical location as the server processor 66, or located remotely and/or partially or completely network-based. The server output device 86 may transmit information from the server processor 66 to the user 14, and may be similar to the user output device 42. The server output device 86 may be located with the server processor 66, or located remotely and/or partially or completely network-based.

The server memory 70 may store processor executable code and/or information comprising the server database 78 and cloud server software 74. In some embodiments, the cloud server software 74 may be stored as a data structure, such as the server database 78 and/or data table, for example, or in non-data structure format such as in a non-compiled text file. In some embodiments, the server memory 70 may store a backup kernel image 104, a backup filesystem 106, and one or more backup software application 108.

The backup kernel image 104 may be a kernel image provided with kernel validity information indicative of at least one of an integrity and an authenticity of the backup kernel image 104. In some embodiments, the kernel validity information is a checksum. In some embodiments, the kernel validity information is a digital signature.

The backup software application 108 may be one or more software application provided with software validity information indicative of at least one of an integrity and an authenticity of the backup software application 108. In some embodiments, the software validity information is a checksum. In some embodiments, the software validity information is a digital signature.

The nodes 22 (e.g., the first node 22a and/or the second node 22b) may include one or more devices that gather, process, store, and/or provide information in response to a request in a manner described herein. For example, the nodes 22 may include one or more optical data processing and/or traffic transfer devices, such as an optical node, an optical amplifier (e.g., a doped fiber amplifier, an erbium doped fiber amplifier, a Raman amplifier, etc.), an optical add-drop multiplexer ("OADM"), a reconfigurable optical add-drop multiplexer ("ROADM"), a flexibly reconfigurable optical add-drop multiplexer module ("FRM"), an optical source component (e.g., a laser source), an optical source destination (e.g., a laser sink), an optical multiplexer, an optical demultiplexer, an optical transmitter, an optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic.

In some implementations, the node 22 may include OADMs and/or ROADMs capable of being configured to add, drop, multiplex, and demultiplex optical signals. The nodes 22 may process and transmit optical signals to other nodes 22 throughout the transport network 26 in order to deliver optical transmissions.

Figure 4:
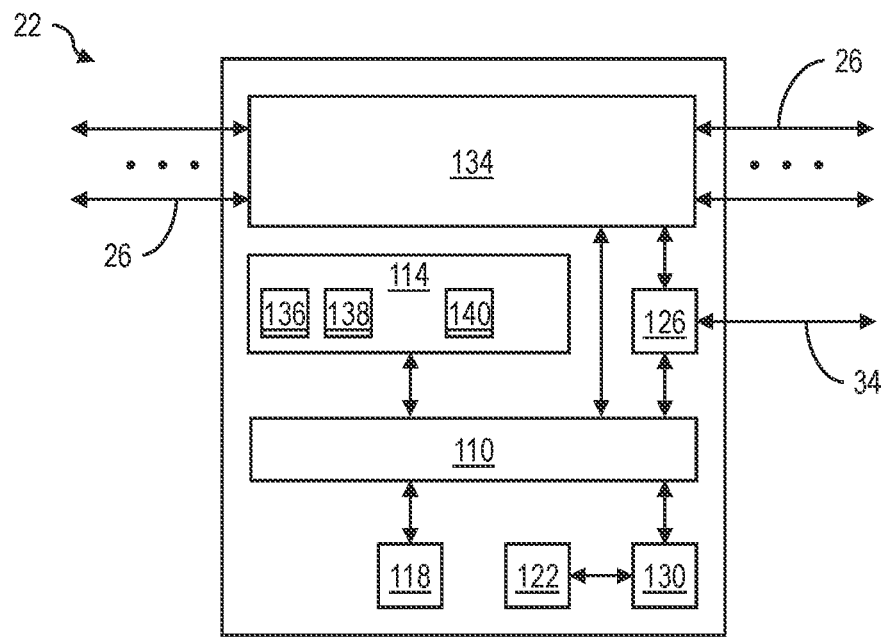
FIG. 4 is a diagram of an exemplary embodiment of a node of the hybrid boot system shown in FIG. 1.

Referring now to FIG. 4, shown therein is a diagram of an exemplary embodiment of a node 22 (e.g., the first node 22a and/or the second node 22b) constructed in accordance with the present disclosure. The node 22 may comprise an embedded device 110, a first node memory 114, a second node memory 118, a third node memory 122, and a node communication device 126 allowing one or more component of the node 22 to communicate to one or more other component of the node 22 or to another node 22 in the hybrid boot system 10 via the communication network 34. In the illustrated embodiment, the node 22 is further provided with a secure boot subsystem 130 and a client data module 134.

The first node memory 114 may store one or more default kernel image 136 (hereinafter "default kernel image 136"), one or more default filesystem 138 (hereinafter "default filesystem 138"), and one or more default software application 140 (hereinafter "default software application 140").

The default kernel image 136 may be a kernel image provided with kernel validity information indicative of at least one of an integrity and an authenticity of the default kernel image 136. In some embodiments, the kernel validity information is a checksum. In some embodiments, the kernel validity information is a digital signature.

The default software application 140 may be one or more software application provided with software validity information indicative of at least one of an integrity and an authenticity of the default software application 140. In some embodiments, the software validity information is a checksum. In some embodiments, the software validity information is a digital signature.

The embedded device 110 may comprise, for example, one or more of a computer processor, an application specific integrated circuit, a field programmable gate array, a programmable circuit board, a digital signal processor, and a microcontroller.

Each of the first node memory 114, the second node memory 118, and/or the third node memory 122 may be a non-transitory computer readable medium such as, for example, a RAM, a CD-ROM, a hard drive, a solid-state drive, a flash drive, a memory card, a DVD-ROM, a disk, an optical drive, combinations thereof, and/or the like.

The third node memory 122 may store a hybrid boot sequence (not shown) comprising computer-executable instructions that when executed by the embedded device 110 cause the embedded device 110 to perform a hybrid boot method such as, for example, the hybrid boot method 164 and/or the hybrid boot method 208.

The secure boot subsystem 130 may be operable to verify a kernel image prior to the kernel image being loaded into the second node memory 118 and booted. Each kernel image may be provided with kernel validity information (not shown) such as, for example, a checksum, a digital signature, combinations thereof, and/or the like.

If the kernel validity information (not shown) of a particular kernel image comprises a checksum, the secure boot subsystem 130 may process the kernel image using a hash function such as, for example, MD5, SHA-1, SHA-256, combinations thereof, and/or the like. Having processed the kernel image, the secure boot subsystem 130 may then compare the processed kernel image with the provided checksum. Where the processed kernel image matches the provided checksum, the secure boot subsystem 130 may send data to the embedded device 110 indicative of a successful verification. Where the processed kernel image does not match the provided checksum, the secure boot subsystem 130 may send data to the embedded device 110 indicative of a failed verification.

If the kernel validity information (not shown) of a particular kernel image comprises a digital signature, the secure boot subsystem 130 may decrypt the digital signature using a public key to generate a decrypted digital signature. Having decrypted the digital signature, the secure boot subsystem 130 may then process the kernel image using a hash function, before comparing the decrypted digital signature with the processed kernel image. Where the processed kernel image matches the decrypted digital signature, the secure boot subsystem 130 may send data to the embedded device 110 indicative of a successful verification. Where the processed kernel image does not match the decrypted digital signature, the secure boot subsystem 130 may send data to the embedded device 110 indicative of a failed verification.

In one embodiment, the client data module 134 comprises one or more hardware device. In one embodiment, the one or more hardware device comprises one or more digital coherent optics module having one or more coherent optical transceiver operable to receive a client data from an electrical signal and transmit the client data in an optical signal and/or receive the client data from an optical signal and transmit the client data in an electrical signal, or a combination thereof.

The number of devices illustrated in FIG. 4 is provided for explanatory purposes. In practice, there may be additional devices, fewer devices, different devices, or differently arranged devices than are shown in FIG. 4. Furthermore, two or more of the devices illustrated in FIG. 4 may be implemented within a single device, or a single device illustrated in FIG. 4 may be implemented as multiple, distributed devices. Additionally, one or more of the devices illustrated in FIG. 4 may perform one or more functions described as being performed by another one or more of the devices illustrated in FIG. 4. Devices illustrated in FIG. 4 may interconnect via wired connections (e.g., fiber-optic connections).

Figure 5:
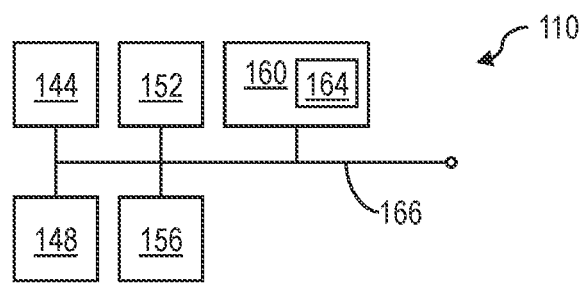
FIG. 5 is a diagram of an exemplary embodiment of an embedded system of the node shown in FIG. 4.

Referring now to FIG. 5, shown therein is an exemplary embodiment of the embedded device 110 constructed in accordance with the present disclosure. In some embodiments, the embedded device 110 may include, but is not limited to, one or more embedded input device 144 (hereinafter "embedded input device 144"), one or more embedded output device 148 (hereinafter "embedded output device 148"), one or more embedded processor 152 (hereinafter "embedded processor 152"), one or more embedded communication device 156 (hereinafter "embedded communication device 156") operable to interface with the node communication device 126, one or more non-transitory computer readable medium 160 (hereinafter "embedded memory 160") storing processor-executable code and/or software application(s). The embedded input device 144, embedded output device 148, embedded processor 152, embedded communication device 156, and embedded memory 160 may be connected via a path 166 such as a data bus that permits communication among the components of the embedded device 110.

The embedded input device 144 may be capable of receiving client data and transmitting the client data to other components of the hybrid boot system 10. The embedded input device 144 may include, but is not limited to, implementation as an optical network interface, an electrical network interface, combinations thereof, and/or the like, for example.

The embedded output device 148 may be capable of outputting client data. For example, implementations of the embedded output device 148 may include, but are not limited to, implementation as an optical network interface, an electrical network interface, combinations thereof, and/or the like, for example.

Figure 6:
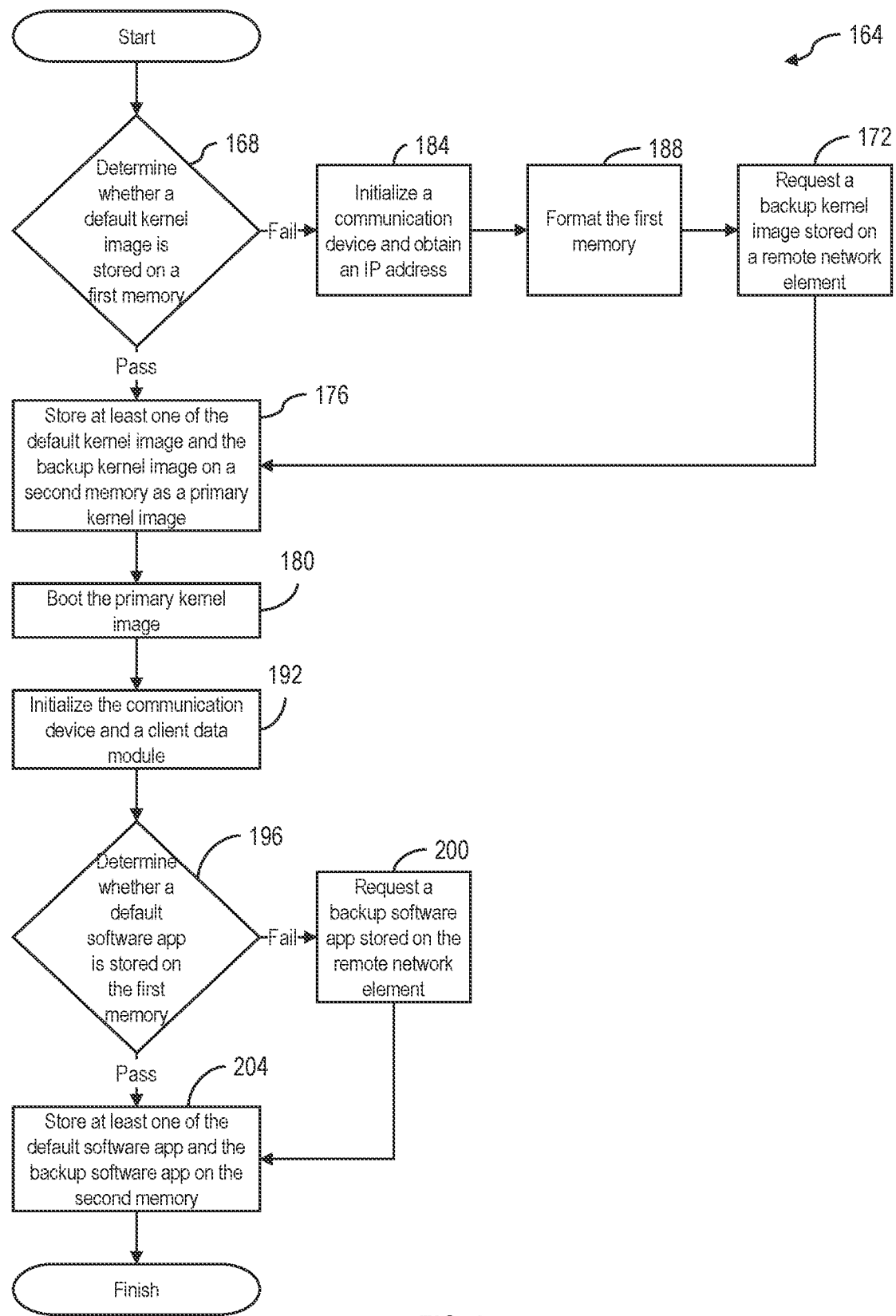
FIG. 6 is a process flow diagram of an exemplary embodiment of a hybrid boot method according to the present disclosure.

Referring now to FIG. 6, shown therein is a process flow diagram of an exemplary hybrid boot method 164 in accordance with the present disclosure. In certain embodiments, the hybrid boot method 164 comprises the steps of: determining whether a default kernel image 136 is stored on a first node memory 114 (step 168); responsive to the determination that the default kernel image 136 is not stored on the first node memory 114, requesting a backup kernel image 104 (step 172); storing at least one of the default kernel image 136 and the backup kernel image 104 on a second node memory 118 as a primary kernel image (step 176); and booting the primary kernel image (step 180).

In certain embodiments, determining whether the default kernel image 136 is stored on the first node memory 114 (step 168) is further defined as determining, with the embedded device 110, whether the default kernel image 136 is stored on the first node memory 114.

In certain embodiments, requesting the backup kernel image 104 (step 172) may be further defined as requesting, with the embedded device 110 utilizing the node communication device 126, the backup kernel image 104 via the communication network 34. The backup kernel image 104 may be stored on a remote network element 22 (e.g., the first node 22a, the second node 22b, and/or the cloud-based server 22c).

In certain embodiments, responsive to receiving the request for the backup kernel image 104, the remote network element 22 (e.g., the first node 22a, the second node 22b, and/or the cloud-based server 22c) may transmit the backup kernel image 104 to the requesting network element 22. In certain embodiments, responsive to receiving the request for the backup kernel image 104, the remote network element 22 (e.g., the first node 22a, the second node 22b, and/or the cloud-based server 22c) may transmit to the requesting network element 22 a negative response indicating that the backup kernel image 104 cannot be provided.

In certain embodiments, storing at least one of the default kernel image 136 and the backup kernel image 104 on the second node memory 118 as the primary kernel image (step 176) may be further defined as storing, with the embedded device 110, at least one of the default kernel image 136 and the backup kernel image 104 on a second node memory 118 as the primary kernel image. In some embodiments, storing at least one of the default kernel image 136 and the backup kernel image 104 on the second node memory 118 as the primary kernel image may comprise storing at least one of the default kernel image 136 and the backup kernel image 104 at a boot address on the second node memory 118.

In certain embodiments, booting the primary kernel image (step 180) may be further defined as booting, with the embedded device 110, the primary kernel image. In some embodiments, the hybrid boot method 164 may further comprise the step of, prior to booting the primary kernel image, locating the primary kernel image stored at the boot address on the second node memory 118.

In certain embodiments, the hybrid boot method 164 may further comprise the steps of, responsive to the determination that the default kernel image 136 is not stored on the first memory, initializing the communication device, and obtaining an IP address (step 184); and formatting the first node memory 114 (step 188).

In certain embodiments, initializing the node communication device 126 and obtaining an IP address (step 184) may be further defined as initializing the node communication device 126 and obtaining the IP address via the communication network 34.

Formatting the first node memory 114 (step 188) may be further defined as formatting the first node memory 114 in any format that is capable of performing the claimed invention.

In certain embodiments, the hybrid boot method 164 may further comprise the steps of, subsequent to booting the primary kernel image: initializing each of the node communication device 126 and the client data module 134 (step 192); determining whether one or more default software application 140 (hereinafter "default software application 140") is stored on the first node memory 114 (step 196); responsive to the determination that the default software application 140 is not stored on the first node memory 114, requesting a backup software application 108 (step 200); and storing at least one of the default software application 140 and the backup software application 108 on the second node memory 118 (step 204).

The default software application 140 may be one or more software application provided with software validity information indicative of at least one of an integrity and an authenticity of the default software application 140. In some embodiments, the software validity information is a checksum. In some embodiments, the software validity information is a digital signature.

In certain embodiments, requesting the backup software application 108 may be further defined as requesting, via the communication network 34, the backup software application 108. The backup software application 108 may be stored on a remote network element 22 (e.g., the first node 22a, the second node 22b, and/or the cloud-based server 22c).

In certain embodiments, responsive to receiving the request for the backup software application 108, the remote network element 22 (e.g., the first node 22a, the second node 22b, and/or the cloud-based server 22c) may transmit the backup software application 108 to the requesting network element 22. In certain embodiments, responsive to receiving the request for the backup software application 108, the remote network element 22 (e.g., the first node 22a, the second node 22b, and/or the cloud-based server 22c) may transmit to the requesting network element 22 a negative response indicating that the backup software application 108 cannot be provided.

Storing at least one of the default software application 140 and the backup software application 108 on the second node memory 118 may be further defined as storing an available one of the default software application 140 and the backup software application 108 on the second node memory 118.

Figure 7:
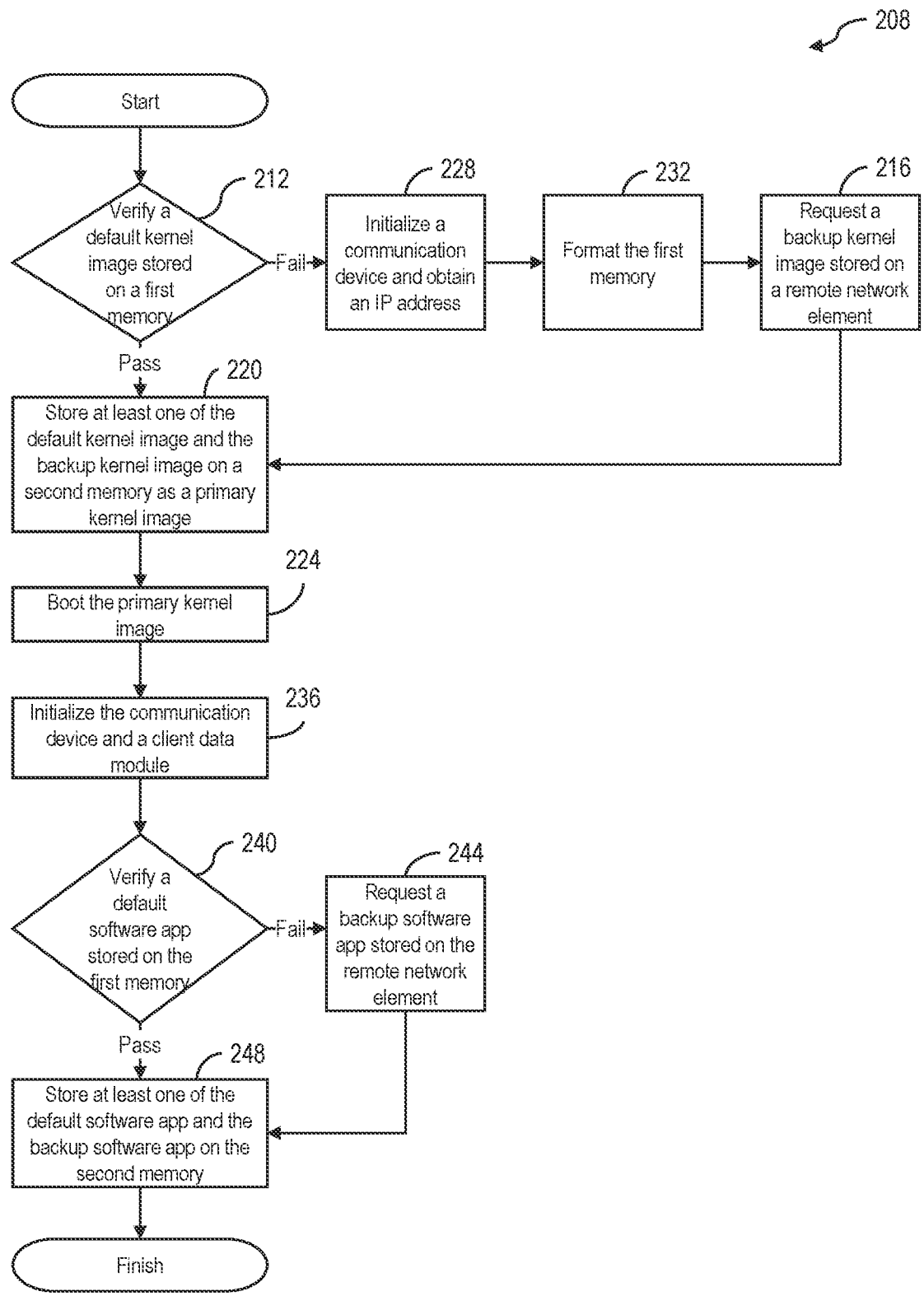
FIG. 7 is a process flow diagram of another exemplary embodiment of the hybrid boot method according to the present disclosure.

Referring now to FIG. 7, shown therein is a process flow diagram of another exemplary hybrid boot method 208 in accordance with the present disclosure. In certain embodiments, the hybrid boot method 208 comprises the steps of: verifying a default kernel image 136 (step 212); responsive to a failure of the verification of the default kernel image 136, requesting a backup kernel image 104 (step 216); storing at least one of the default kernel image 136 and the backup kernel image 104 on a second node memory 118 as a primary kernel image (step 220); and booting the primary kernel image (step 224).

In certain embodiments, verifying the default kernel image 136 (step 212) is further defined as verifying, with the embedded device 110, the default kernel image 136 stored on the first node memory 114. The default kernel image 136 may be provided with kernel validity information (not shown) indicative of at least one of an integrity and an authenticity of the default kernel image 136. The verification of the default kernel image 136 may be based at least in part on the kernel validity information (not shown). The first node memory 114 may be a non-transitory computer-readable medium.

In certain embodiments, requesting the backup kernel image 104 (step 216) may be further defined as requesting, with the embedded device 110 utilizing the node communication device 126, the backup kernel image 104 via the communication network 34. The node communication device 126 may be in communication with the embedded device 110. The node communication device 126 may be operable to communicate via the communication network 34. The backup kernel image 104 may be stored on a remote network element 22 (e.g., the first node 22a, the second node 22b, and/or the cloud-based server 22c).

In certain embodiments, responsive to receiving the request for the backup kernel image 104, the remote network element 22 (e.g., the first node 22a, the second node 22b, and/or the cloud-based server 22c) may transmit the backup kernel image 104 to the requesting network element 22. In certain embodiments, responsive to receiving the request for the backup kernel image 104, the remote network element 22 (e.g., the first node 22a, the second node 22b, and/or the cloud-based server 22c) may transmit to the requesting network element 22 a negative response indicating that the backup kernel image 104 cannot be provided.

In certain embodiments, storing at least one of the default kernel image 136 and the backup kernel image 104 on the second node memory 118 as a primary kernel image (step 220) may be further defined as storing, with the embedded device 110, at least one of the default kernel image 136 and the backup kernel image 104 on a second node memory 118 as a primary kernel image. The second node memory 118 may be a non-transitory computer-readable medium.

In certain embodiments, booting the primary kernel image (step 224) may be further defined as booting, with the embedded device 110, the primary kernel image.

In certain embodiments, the hybrid boot method 208 may further comprise the steps of, responsive to the failure of the verification of the default kernel image 136: initializing the node communication device 126 and obtaining an IP address (step 228); and formatting the first node memory 114 (step 232).

In certain embodiments, initializing the node communication device 126 and obtaining an IP address (step 228) may be further defined as initializing the node communication device 126 and obtaining the IP address via the communication network 34.

Formatting the first node memory 114 (step 232) may be further defined as formatting the first node memory 114 in any format that is capable of performing the claimed invention.

In certain embodiments, the hybrid boot method 208 may further comprise the steps of, subsequent to booting the primary kernel image: initializing each of the communication device and the client data module (step 236); verifying the default software application 140 based at least in part on the second validity information (not shown) (step 240); responsive to a failure of the verification of the default software application 140, requesting a backup software application 108 via the communication network, the backup software application 108 stored on the remote network element 22 (step 244); and storing at least one of the default software application 140 and the backup software application 108 on the second node memory 118 (step 248).

In certain embodiments, requesting the backup software application 108 (step 216) may be further defined as requesting, via the communication network 34, the backup software application 108 stored on the remote network element 22 (step 244).

In certain embodiments, responsive to receiving the request for the backup software application 108, the remote network element 22 (e.g., the first node 22a, the second node 22b, and/or the cloud-based server 22c) may transmit the backup software application 108 to the requesting network element 22. In certain embodiments, responsive to receiving the request for the backup software application 108, the remote network element 22 (e.g., the first node 22*a*, the second node 22*b*, and/or the cloud-based server 22*c*) may transmit to the requesting network element 22 a negative response indicating that the backup software application 108 cannot be provided.

In certain embodiments, storing at least one of the default software application 140 and the backup software application 108 (step 248) may be further defined as storing an available one of the default software application 140 and the backup software application 108 on the second node memory 118.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A network element for a transport network, comprising:
   an embedded device having a processor;
   a communication device in communication with the processor of the embedded device and operable to communicate via a communication network;
   a plurality of memory locations comprising at least a first memory and a second memory, each of the plurality of memory locations being a non-transitory computer-readable medium, wherein the second memory comprises a random access memory (RAM) location,
   and
   wherein a hybrid boot sequence is stored among the plurality of memory locations, the hybrid boot sequence including a RAM boot sequence associated with the RAM location, and a disk boot sequence that is both distinct in operation from the RAM boot sequence and associated with a at least one memory location among the plurality of memory locations, the hybrid boot sequence further comprising computer-executable instructions that when executed by the processor of the embedded device cause the embedded device to:
      determine whether a first kernel image is stored on the first memory;
      responsive to a determination in the determination step that the first kernel image is not stored on the first memory, request a second kernel image via the communication network, the second kernel image stored on a remote network element in the transport network;
      store at least one of the first kernel image and the second kernel image on the second memory as a primary kernel image;
      execute the RAM boot sequence to accomplish a RAM boot of the primary kernel image stored on the second memory;
      determine, with reference to at least a select one or more of the plurality of memory locations, whether a select default software application is stored at the select one or more of the plurality of memory locations;
      responsive to a determination in the determination step that the select software application is not stored at the select one or more of the plurality of memory locations, request a backup software application via the communication network, the backup software application stored on a remote network element in the transport network, and store among the plurality of memory locations the backup software application as communicated to the network element in response to the request for the backup software application via the communication network; and
      execute the disc boot sequence to accomplish a disc boot at the network element of at least one of the select default software application and the backup software application stored among the plurality of memory locations.

2. The network element of claim 1, wherein the first kernel image is provided with validity information indicative of at least one of an integrity and an authenticity of the first kernel image.

3. The network element of claim 2, wherein the validity information is at least one of a checksum and a digital signature.

4. The network element of claim 1, wherein the computer executable instructions when executed by the processor of the embedded device further cause the embedded device to:
   responsive to a determination in the determination step that the first kernel image is not stored on the first memory, initialize the communication device, and obtain an IP address via the communication network.

5. The network element of claim 4, wherein the computer-executable instructions when executed by the processor of the embedded device further cause the embedded device to:
   responsive to a determination in the determination step that the first kernel image is not stored on the first memory, format the first memory.

6. The network element of claim 1, wherein the network element further comprises one or more hardware device.

7. The network element of claim 6, wherein the transport network is an optical transport network, and wherein the one or more hardware device comprises a digital coherent optics module and a plurality of optical transceivers.

8. The network element of claim 6, wherein the computer-executable instructions when executed by the processor of the embedded device further cause the embedded device to:
   subsequent to the RAM boot of the primary kernel image, initialize each of the communication device and the one or more hardware device.

9. The network element of claim 1, wherein the remote network element is a cloud-based server.

10. A network element in a transport network, the network element comprising:
    an embedded device comprising a processor;
    a communication device in communication with the embedded device and operable to communicate via a communication network;
    a plurality of memory locations comprising at least a the first memory and a second memory, each of the plurality of memory locations being a non-transitory computer-readable medium, wherein the first memory is configured to store a first kernel image provided with validity information indicative of at least one of an integrity and an authenticity of the first kernel image wherein the second memory comprises a random access memory (RAM) location, wherein at least one of the plurality of memory locations is configured to store a first software application provided with second validity information indicative of at least one of an integrity and an authenticity of the first software application, and wherein a hybrid boot sequence is stored among the plurality of memory locations, the hybrid boot sequence including a RAM boot sequence associated with the RAM location, and a disk boot sequence that is both distinct in operation from the RAM boot sequence and associated with at least one memory location among the plurality of memory locations, the hybrid boot sequence further including computer-executable instructions that when executed by the processor of the embedded device cause the embedded device to:

verify the first kernel image based at least in part on the validity information;

responsive to a failure of the verification of the first kernel image, request a second kernel image via the communication network, the second kernel image stored on a remote network element;

store at least one of the first kernel image and the second kernel image on the second memory as a primary kernel image; and execute the RAM boot sequence to accomplish a RAM boot of the primary kernel image;

verify the first software application based at least in part on the second validity information;

responsive to a failure of the verification of the first software application, request a second software application via the communication network, the second software application stored on a remote network element, and store among the plurality of memory locations the second software application as communicated to the network element in response to the request for the second software application via the communication network; and execute the disc boot sequence to accomplish a disc boot at the network element of at least one of the select first software application and the second software application.

11. The network element of claim 10, wherein the validity information is at least one of a checksum and a digital signature.

12. The network element of claim 10, wherein the computer executable instructions when executed by the processor of the embedded device further cause the embedded device to:

responsive to the failure of the verification of the first kernel image, initialize the communication device, and obtain an IP address via the communication network.

13. The network element of claim 12, wherein the computer-executable instructions when executed by the processor of the embedded device further cause the embedded device to:

responsive to the failure of the verification of the first kernel image, format the first memory.

14. The network element of claim 10, wherein the network element further comprises one or more hardware device.

15. The network element of claim 14, wherein transport network is an optical transport network, and wherein the one or more hardware device comprises a digital coherent optics module and a plurality of optical transceivers.

16. The network element of claim 14, wherein the computer-executable instructions when executed by the processor of the embedded device further cause the embedded device to:

subsequent to the RAM boot of the primary kernel image, initialize each of the communication device and the one or more hardware device.

17. The network element of claim 10, wherein the second validity information is at least one of a checksum and a digital signature.

18. The network element of claim 10, wherein the remote network element is a cloud-based server.

* * * * *